(12) United States Patent
Yamatani et al.

(10) Patent No.: US 10,745,062 B2
(45) Date of Patent: Aug. 18, 2020

(54) FRONT VEHICLE BODY STRUCTURE

(71) Applicant: TOYOTA JIDOSHA KABUSHIKI KAISHA, Toyota-shi, Aichi-ken (JP)

(72) Inventors: Mamiko Yamatani, Toyota (JP); Shigemi Mizuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 16/137,952

(22) Filed: Sep. 21, 2018

(65) Prior Publication Data

US 2019/0092393 A1 Mar. 28, 2019

(30) Foreign Application Priority Data

Sep. 26, 2017 (JP) ................................ 2017-185008

(51) Int. Cl.
| | | |
|---|---|---|
| *B62D 25/08* | (2006.01) | |
| *B60R 19/48* | (2006.01) | |
| *B60R 19/34* | (2006.01) | |
| *B60R 19/38* | (2006.01) | |

(52) U.S. Cl.
CPC ............ *B62D 25/085* (2013.01); *B60R 19/34* (2013.01); *B60R 19/38* (2013.01); *B60R 19/48* (2013.01)

(58) Field of Classification Search
CPC ...... B62D 25/085; B62D 25/08; B60R 19/48; B60R 19/38; B60R 19/34; B60R 19/02

USPC .............. 296/187.09, 203.02, 193.09, 29, 30
See application file for complete search history.

(56) References Cited

U.S. PATENT DOCUMENTS

| | | | | |
|---|---|---|---|---|
| 4,428,447 A | * | 1/1984 | Malen ................... | B62D 25/084 165/53 |
| 6,712,426 B2 | * | 3/2004 | Ritchie ................ | B62D 25/084 296/187.09 |
| 7,497,289 B2 | * | 3/2009 | Kwun ................... | B62D 25/084 180/68.4 |
| 8,622,466 B2 | * | 1/2014 | Joly-Pottuz .......... | B62D 25/085 180/68.4 |
| 9,321,495 B2 | * | 4/2016 | Townson ............... | B62D 65/02 |
| 9,533,714 B2 | * | 1/2017 | Riedl .................... | B62D 25/084 |
| 2014/0062140 A1 | * | 3/2014 | Townson ............. | B62D 25/085 296/193.09 |

FOREIGN PATENT DOCUMENTS

JP 2009-067184 A 4/2009

* cited by examiner

*Primary Examiner* — Jason S Morrow
*Assistant Examiner* — E Turner Hicks
(74) *Attorney, Agent, or Firm* — Oliff PLC

(57) ABSTRACT

A bumper reinforcement has a bracket to which a brace is attached. A radiator support member has an attachment seat. The direction of an attachment surface of the bracket to which the brace is attached is the same as the direction of an attachment surface of the attachment seat to which the brace is attached. A through-hole having a long-hole shape to cope with the variation of the distance between through-holes of the attachment surfaces is formed in the brace.

5 Claims, 4 Drawing Sheets

FRONT VEHICLE BODY STRUCTURE

CROSS REFERENCE TO RELATED APPLICATION

The disclosure of Japanese Patent Application No. 2017-185008 filed on Sep. 26, 2017 including the specification, claims, drawings, and abstract is incorporated herein by reference in its entirety.

TECHNICAL FIELD

The present disclosure relates to a front vehicle body structure.

BACKGROUND

A radiator is often disposed at a front end of a vehicle to ensure cooling capability. A structural member of the vehicle body is disposed so as not to block the flow of air passing through the radiator. This structure is disadvantageous to the enhancement of rigidity of the vehicle body. PATENT DOCUMENT 1 below shows bulk head front stays (38a and 38b) which serve as braces and which are coupled to the central portion of a bulk head upper center frame (18) extending in a front edge upper portion of the vehicle body in a vehicle width direction, and the vicinity of the front ends of front side frames (12a and 12b).

CITATION LIST

Patent Literature

[PATENT DOCUMENT 1] JP 2009-67184 A

SUMMARY

Technical Problem

An oblique structural member serving as a brace (hereinafter, referred to as a brace) such as the bulk head front stay disclosed in PATENT DOCUMENT 1 above is advantageous to the enhancement of rigidity of a front vehicle body structure. However, there is a problem of strain caused in the front vehicle body structure when the brace is attached and thus integrated, unless the dimensional accuracy of a brace attachment point on a vehicle body side is sufficient.

The present disclosure is intended to reduce strain of a front vehicle body structure caused when a brace is integrated.

Solution to Problem

A front vehicle body structure according to the present disclosure comprises: a front edge upper structural member which extends in a front edge upper portion of a vehicle body along a vehicle width direction and which constitutes a part of the vehicle body; a bumper reinforcement disposed below and in front of the front edge upper structural member; and a pair of braces which are each joined to and thus link the front edge upper structural member and the bumper reinforcement and which are disposed in a truncated chevron shape or an inverted truncated chevron shape when viewed in front. The bumper reinforcement is provided with an attachment surface to which the braces are attached, where the braces and the bumper reinforcement are joined. The front edge upper structural member is provided with an attachment surface to which the braces are attached, where the braces and the front edge upper structural member are joined.

The direction of the attachment surface provided in the bumper reinforcement is the same as the direction of the attachment surface provided in the front edge upper structural member. Thus, even if the direction of a straight line connecting an attachment point which is a position where the braces are attached to the bumper reinforcement and an attachment point which is a position where the braces are attached to the front edge upper structural member varies due to the individual differences between vehicle bodies, the attachment surface of the bumper reinforcement and attachment surfaces of the braces facing the former attachment surface can face each other forwardly, as can the attachment surface of the front edge upper structural member and attachment surfaces of the braces facing the former attachment surface.

Furthermore, one of the joint of the brace and the bumper reinforcement and the joint of the brace and the front edge upper structural member is provided with a joining position adjustment structure which adjusts a joining position on the brace in the longitudinal direction of the brace. It is thus possible to cope with the variation of the distance between the attachment points.

The aforementioned joining position adjustment structure may be provided in the joint of the brace and the bumper reinforcement, and may comprise a long hole which is formed in at least one of the brace and the bumper reinforcement and which is long in the longitudinal direction of the brace, and a bolt which passes through the long hole and which fastens the brace and the bumper reinforcement. By changing the position of the bolt in the long hole, it is possible to cope with the variation of the distance between the attachment points.

Furthermore, the bumper reinforcement may comprise a bracket in which the attachment surface to attach the brace is formed, and the bracket may have, in the vicinity of at least the long hole, a flange extending along the longitudinal direction of the brace. Rigidity deterioration of the brace resulting from the provision of the long hole can be compensated for at least partially.

Alternatively, in another aspect of the aforementioned joining position adjustment structure, the joining position adjustment structure may be provided in the joint of the brace and the front edge upper structural member, and may comprise a long hole which is formed in at least one of the brace and the front edge upper structural member and which is long in the longitudinal direction of the brace, and a bolt which passes through the long hole and which fastens the brace and the front edge upper structural member.

Advantageous Effects of Invention

By bringing the direction of an attachment surface provided in a bumper reinforcement into the same direction as the direction of an attachment surface provided in a front edge upper structural member, and providing a joining position adjustment structure, it is possible to absorb a dimensional variation resulting from the individual differences between vehicle bodies, and suppress strain of a vehicle body resulting from the attachment and joining of a brace.

BRIEF DESCRIPTION OF DRAWINGS

Embodiment(s) of the present disclosure will be described by reference to the following figures, wherein.

DESCRIPTION OF EMBODIMENTS

Figure 1:
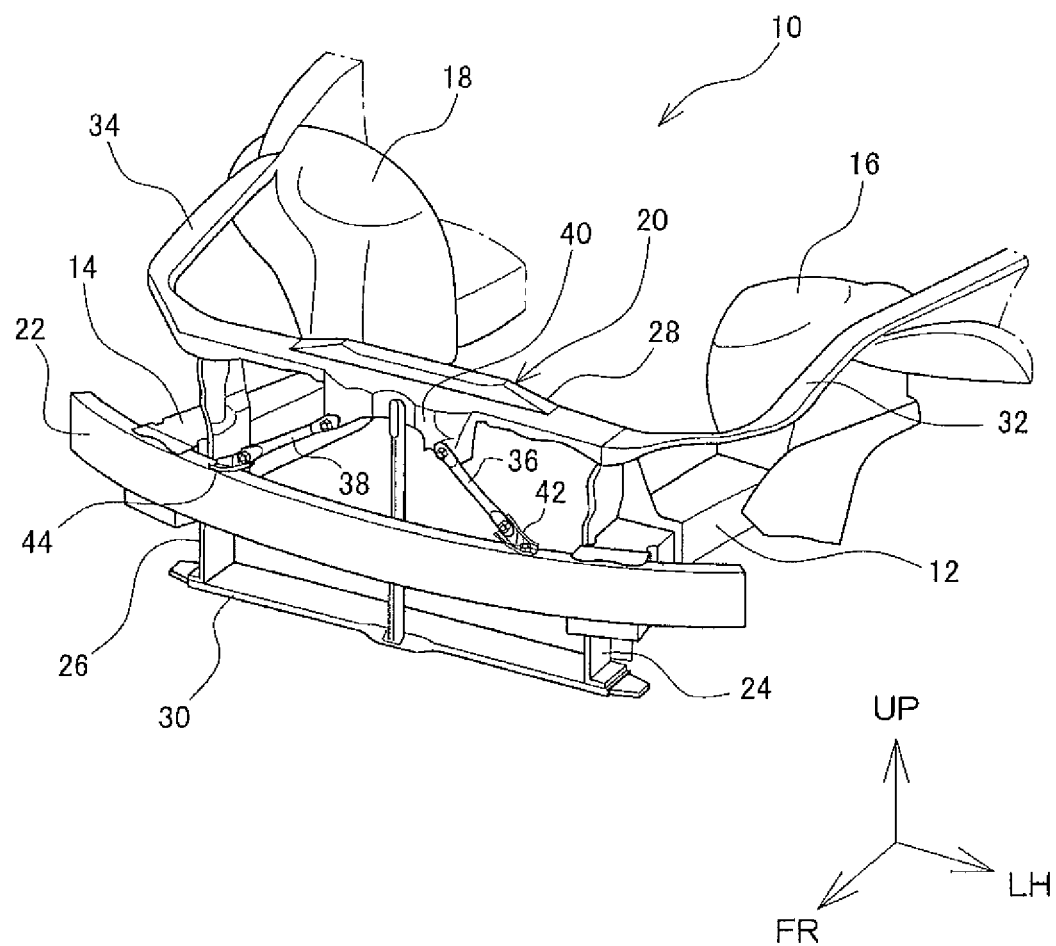
FIG. 1 is a perspective view showing the schematic configuration of a front vehicle body structure according to the present embodiment.
Figure 2:
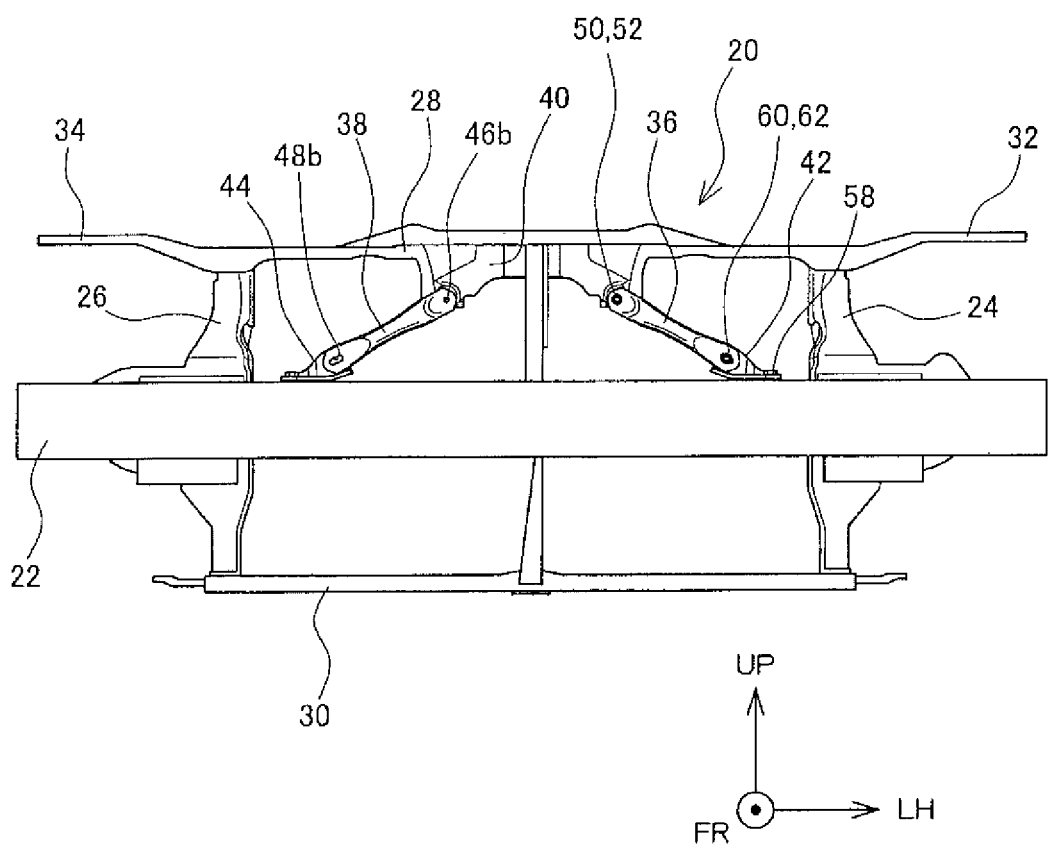
FIG. 2 is a front view showing the front vehicle body structure according to the present embodiment.

Hereinafter, an embodiment of the present disclosure is described with reference to the drawings. FIG. 1 is a perspective view schematically showing a front vehicle body structure 10. FIG. 2 is a view in which the front vehicle body structure 10 is viewed from the front; i.e., a front view. The direction of an arrow FR indicated in FIG. 1 is the frontward direction of the vehicle, the direction of an arrow LH is the leftward direction of the vehicle, and the direction of an arrow UP is the upward direction of the vehicle. In the following explanation, unless otherwise specified, terms representing directions and bearings such as forward, backward, leftward, rightward, upward, and downward directions indicate directions regarding the vehicle.

The front vehicle body structure 10 comprises a pair of front side members 12 and 14 extending in the forward/backward direction on the left and right sides of a vehicle body, respectively. Upwardly extending columnar suspension towers 16 and 18 are provided on the front side members 12 and 14, respectively. Suspension components such as a spring and a shock absorber are disposed in the suspension towers 16 and 18. A substantially quadrangular frame-shaped radiator support member 20 is joined to the front portions of the front side members 12 and 14. The radiator support member 20 supports a radiator (not shown) disposed inside the radiator support member 20. A bumper reinforcement 22 is joined to the front ends of the front side members 12 and 14 via a crash box. The bumper reinforcement 22 is a curved columnar member having a rectangular section, and extends to the left and right so as to bridge the left and right front side members 12 and 14. Moreover, the bumper reinforcement 22 is located in front of the radiator support member 20, and substantially in the center of the radiator support member 20 in the height direction.

The radiator support member 20 has left and right lateral side members 24 and 26 thereof joined to the front side members 12 and 14, an upper side member 28 linking the upper ends of the lateral side members 24 and 26, and a lower side member 30 linking the lower ends of the lateral side members 24 and 26. One-side ends of side upper members 32 and 34 are joined to respective ends of the upper side member 28, and the other ends of the side upper members 32 and 34 are joined to the suspension towers 16 and 18. The upper side member 28 of the radiator support member 20 is a front edge upper structural member extending in the front edge upper portion of the vehicle body in the leftward/rightward direction.

Between the upper side member 28 of the radiator support member 20 and the bumper reinforcement 22, braces 36 and 38 linking the upper side member 28 and the bumper reinforcement 22 are provided. The upper ends of the braces 36 and 38 are joined to an attachment seat 40 downwardly formed in the central portion of the upper side member 28. The lower ends of the braces 36 and 38 are joined to attachment points on brackets 42 and 44 provided in the bumper reinforcement 22. The space between the two braces 36 and 38 in the leftward/rightward direction is narrow on the upper end side and wide on the lower end side, and the braces 36 and 38 are disposed in a truncated chevron shape when viewed from the front.

Figure 3:
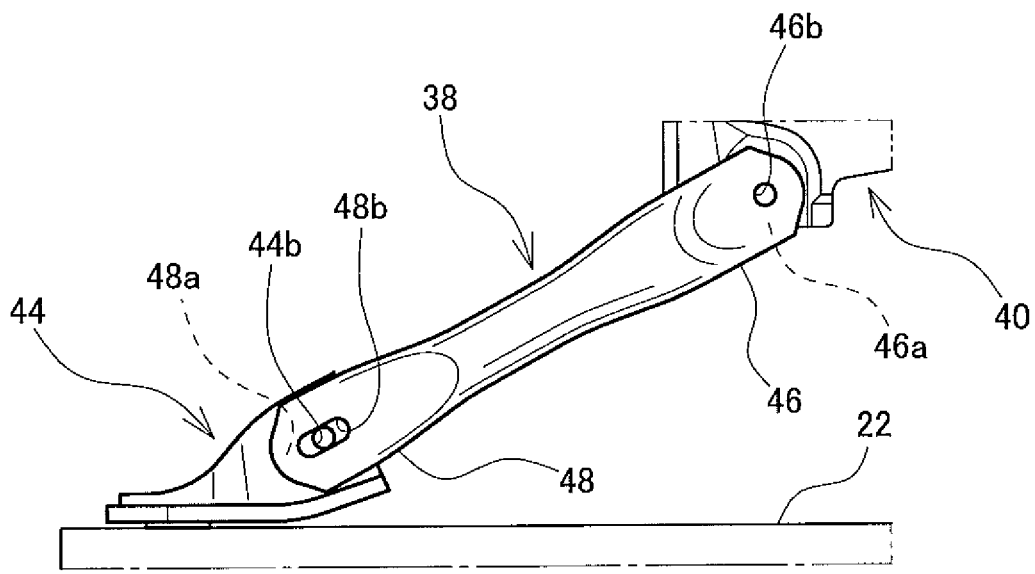
FIG. 3 is a view showing the structures of a brace and the periphery thereof.
Figure 4:
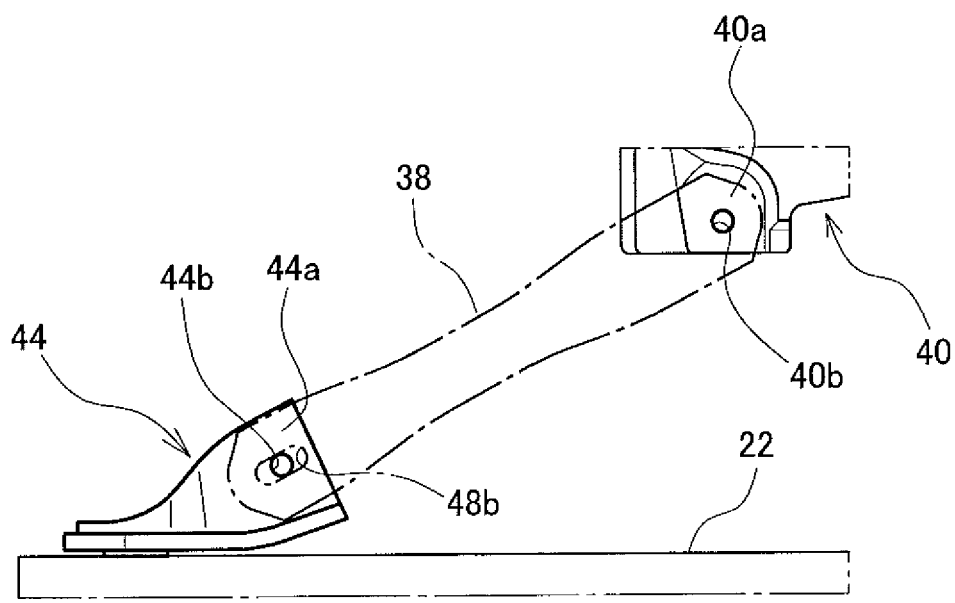
FIG. 4 is a view showing the structure of the brace periphery.
Figure 5:
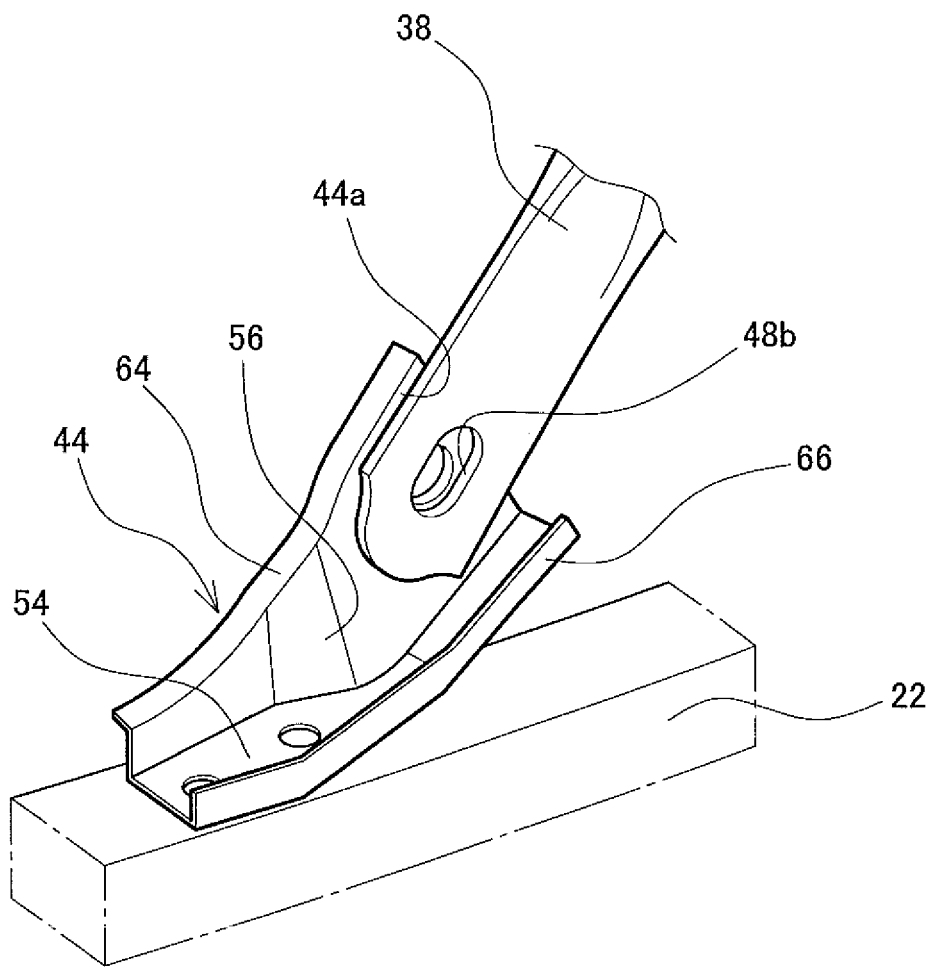
FIG. 5 is a view showing the structures of a bracket and the periphery thereof.

FIGS. 3 to 5 are views showing one brace 38 and vehicle-body-side portions of the front vehicle body structure 10 to which the brace 38 is attached. The structures of the other brace 36 and the periphery thereof are symmetrical, and are therefore are neither shown in the drawings nor described. FIG. 3 and FIG. 4 are views showing the brace 38, and the attachment seat 40 of the radiator support member 20 and the bracket 44 of the bumper reinforcement 22 to which the brace 38 is attached. In FIG. 4, the brace 38 is only indicated by an imaginary line in order to clearly show the shapes of the portions of the attachment seat 40 and the bracket 44 that are hidden by the brace 38. FIG. 5 is a view showing the structure of the periphery of the bracket 44. It should be noted that a bolt to join each member is omitted.

The brace 38 has a central portion which is a circular pipe, and has, at respective ends, attachment portions 46 and 48 formed by flatly crushing the circular pipe. The attachment portion 46 on the attachment seat 40 side is referred to as an upper attachment portion 46, and the attachment portion 48 on the bumper reinforcement 22 side is referred to as a lower attachment portion 48.

The attachment seat 40 has an attachment surface 40a to which the upper attachment portion 46 of the brace 38 is attached. The attachment surface 40a is a flat surface, and faces in the frontward direction of the vehicle. A surface (hereinafter, referred to as a facing surface 46a) of the upper attachment portion 46 of the brace 38 facing the attachment surface 40a is also a flat surface. The facing surface 46a is a surface facing toward the far side of the paper in FIG. 3. Through-holes 40b and 46b are provided in the attachment surface 40a and the facing surface 46a, respectively. The brace 38 is joined to the attachment seat 40 by a bolt 50 passing through the through-holes 40b and 46b, and a nut 52 which is screwed onto the bolt 50 (see FIG. 2). In FIG. 2, the bolt 50 and the nut 52 are only shown regarding the brace 36, and are omitted regarding the brace 38 side. By fastening the bolt 50 and the nut 52, the attachment surface 40a and the facing surface 46a come into close contact. The bolt 50 may be a hexagon head bolt. Alternatively, the bolt 50 may be a bolt which is fixed to the attachment surface 40a by welding or the like and which is erected forward. In this case, the through-hole 40b is unnecessary.

The bracket 44 has a substantially L-shaped section, and is fixed to the upper surface of the bumper reinforcement 22 with a bottom plate 54 corresponding to the horizontal stroke of the letter L by use of a bolt 58 (see FIG. 2). The brace 38 is attached to an erected plate 56 corresponding to the vertical stroke of the letter L. In order to determine the direction of the bracket 44 in a plane defined by the upper surface of the bumper reinforcement 22, the bracket 44 may be fixed by two bolts. Alternatively, the bracket 44 may be fixed by one bolt, and a projection to determine the direction of the bracket 44 may be provided on the upper surface of the bumper reinforcement 22. The edge of the bottom plate 54 of the bracket 44 is brought into abutment with this projection in order to perform positioning.

The erected plate 56 of the bracket 44 has an attachment surface 44a to which the lower attachment portion 48 of the brace 38 is attached. The attachment surface 44a is a flat surface, and faces in the frontward direction of the vehicle.

A surface (hereinafter, referred to as a facing surface 48a) of the lower attachment portion 48 of the brace 38 facing the attachment surface 44a is also a flat surface. The facing surface 48a is a surface facing toward the far side of the paper in FIG. 3. Through-holes 44b and 48b are provided in the attachment surface 44a and the facing surface 48a, respectively. The brace 38 is joined to the bracket 44 by a bolt 60 passing through the through-holes 44b and 48b, and a nut 62 which is screwed onto the bolt 60. In FIG. 2, the bolt 60 and the nut 62 are only shown regarding the brace 36, and are omitted regarding the brace 38 side. By fastening the bolt 60 and the nut 62, the attachment surface 44a and the facing surface 48a come into close contact. The bolt 60 may be a hexagon head bolt. Alternatively, the bolt 60 may be a bolt which is fixed to the attachment surface 44a by welding or the like and which is erected forward. In this case, the through-hole 44b is unnecessary. The through-hole 48b formed in the lower attachment portion 48 of the brace 38 is a long hole which is long in the longitudinal direction of the brace 38.

The bracket 44 is further provided with, on the side edges thereof, flanges 64 and 66. The flange 64 is provided along the side edge of the erected plate 56, and extends substantially along the longitudinal direction of the brace 38. The flange 66 is provided along the side edge of the bottom plate 54, and extends substantially along the longitudinal direction of the brace 38.

The attachment surface 40a of the attachment seat and the attachment surface 44a of the bracket are formed so that their directions (normal directions) are the same. Thus, the plane defined by the attachment surface 40a and the plane defined by the attachment surface 44a are the same or parallel. Hereinafter, such a relation is simply described as "the attachment surface 40a and the attachment surface 44a are parallel." The planes defined in the facing surfaces 46a and 48a of the brace 38 respectively facing the attachment surfaces 40a and 44a are also the same or parallel. Similarly, such a relation is simply described as "the facing surfaces 46a and 48a are parallel."

In the following explanation, the position of the through-hole 40b provided in the attachment surface 40a of the attachment seat is referred to as an "upper attachment point." Similarly, the position of the through-hole 44b provided in the attachment surface 44a of the bracket is referred to as a "lower attachment point." The brace 38 is attached on the basis of the bolts 50 and 60 passing through the through-holes 40b and 44b.

Even if the position of the upper attachment point and the position of the lower attachment point vary within a cross-sectional surface (a plane defined by the upward/downward direction and the leftward/rightward direction) of the vehicle body, the parallel relation between the attachment surface 40a and the attachment surface 44a is maintained, and the two facing surfaces 46a and 48a of the brace 38 can be kept parallel to the two attachment surfaces 40a and 44a, respectively. Thus, when the brace 38 is joined to the attachment seat 40 and the bracket 42, the facing surfaces 46a and 48a can be brought into close contact with the corresponding attachment surfaces 40a and 44a. When the directions of the two attachment surfaces are not the same in contract to the present embodiment, both the two pairs of attachment surfaces and the facing surfaces cannot be kept parallel if the positional relation of the attachment points changes. If the brace is joined in this state, there are therefore cases where the front vehicle body structure, particularly, the radiator support member, strains so that the attachment surface and the facing surface come into close contact. In the present embodiment, the directions of the two attachment surfaces 40a and 44a are brought into the same direction, and the occurrence of strain during the joining of the brace 38 to the vehicle body side is suppressed.

Furthermore, when the distance between the upper attachment point and the lower attachment point varies, the joining position on the brace 38 can be changed because the through-hole 48b in the lower attachment portion 48 of the brace is a long hole, and it is possible to cope with the variation of the distance between the attachment points. Thus, the through-hole 48b which is a long hole and the bolt 60 passing through the through-hole 48b constitute a joining position adjustment structure to adjust the joining position on the brace 38. When the joining position cannot be changed in accordance with the distance between the attachment points in contract to the present embodiment, the brace is forcibly attached and joined, and in some cases the front vehicle body structure may strain. For example, the substantially rectangular radiator support member 20 may strain into a parallelogram. In the present embodiment, the occurrence of strain during the joining of the brace 38 to the vehicle body side of the front vehicle body structure 10 is suppressed by providing the joining position adjustment structure.

Because the through-hole 48b provided in the brace 38 is a long hole, the rigidity of the brace 38 deteriorates. In order to compensate for this rigidity deterioration, the flanges 64 and 66 are provided on the bracket 44 side. The deterioration of the rigidity of the brace 38 is compensated for by increasing the rigidity of the bracket 44, so that the total rigidity of the brace 38 and the bracket 44 is ensured. The flanges 64 and 66 are provided in at least a part adjacent to the through-hole 48b which is a long hole. In addition, it may be the case that only one of the flanges 64 and 66 is provided.

The joining position adjustment structure may be provided at the upper end of the brace 38. Moreover, instead of the through-hole 48b of the brace 38, the through-hole 44b of the bracket 44 may be a long hole, or both the through-hole 48b and the through-hole 44b may be long holes. Further, when the joining position adjustment structure is provided at the upper end of the brace 38 as well, one or both of the through-hole 46b of the brace 38 and the through-hole 40b of the attachment seat 40 are formed as long holes.

The two braces may be disposed in an inverted truncated chevron shape which is wide on the upper end side and narrow on the lower end side.

REFERENCE SIGNS LIST

10: front vehicle body structure, 12, 14: front side member, 16, 18: suspension tower, 20: radiator support member, 22: bumper reinforcement, 24, 26: lateral side member; 28: upper side member (front edge upper structural member), 30: lower side member, 32, 34: side upper member, 36, 38: brace, 40: attachment seat, 40a: attachment surface, 40b: through-hole (upper attachment point), 42, 44: bracket, 44a: attachment surface, 44b: through-hole (lower attachment point), 46: upper attachment portion, 46a: facing surface, 46b: through-hole, 48: lower attachment portion, 48a: facing surface, 48b: through-hole (long hole, joining position adjustment structure), 50: bolt, 52: nut, 54: bottom plate, 56: erected plate, 58: bolt, 60: bolt (joining position adjustment structure), 62: nut, 64, 66: flange.

The invention claimed is:

1. A front vehicle body structure comprising:
a front edge upper structural member extending in a front edge upper portion of a vehicle body and along a vehicle width direction, the front edge upper structural member forming a part of the vehicle body;
a bumper reinforcement disposed below and in front of the front edge upper structural member;
a pair of braces, each brace of the pair of braces linking the front edge upper structural member and the bumper reinforcement, and the pair of braces forming a truncated chevron shape or an inverted truncated chevron shape when viewed in from a vehicle front, a normal direction of an attachment surface of the bumper reinforcement to which a first brace of the pair of braces is attached is the same as a normal direction of an attachment surface of the front edge upper structural member to which the first brace is attached; and
a joining position adjustment structure which configured to move a joining position along a longitudinal direction of the first brace, the joining position adjustment structure being disposed in either one of a joint of the first brace and the bumper reinforcement or a joint of the first brace and the front edge upper structural member.

2. The front vehicle body structure according to claim 1, wherein
the joining position adjustment structure is disposed in the joint of the first brace and the bumper reinforcement, the joining position adjustment structure including:
an elongated hole which is formed in at least one of the first brace and the bumper reinforcement, the elongated hole having a length in the longitudinal direction of the first brace that is greater than a width in a transverse direction of the first brace, and
a bolt passing through the elongated hole and fastening the first brace to the bumper reinforcement.

3. The front vehicle body structure according to claim 2, wherein the bumper reinforcement includes a bracket forming the attachment surface of the bumper reinforcement, the bracket having a flange disposed at a transverse side of the elongated hole with respect to the transverse direction of the first brace and extending along the longitudinal direction of the first brace.

4. The front vehicle body structure according to claim 1, wherein
the joining position adjustment structure is disposed in the joint of the first brace and the front edge upper structural member, joining position adjustment structure including:
an elongated hole which is formed in at least one of the first brace and the front edge upper structural member, the elongated hole having a length in the longitudinal direction of the first brace that is greater than a width in a transverse direction of the first brace, and
a bolt passing through the elongated hole and fastening the first brace to the front edge upper structural member.

5. The front vehicle body structure according to claim 2, wherein the bumper reinforcement includes a bracket forming the attachment surface of the bumper reinforcement, the bracket being disposed on an upper surface of the bumper reinforcement.

* * * * *